(12) United States Patent
Saman

(10) Patent No.: US 10,961,636 B2
(45) Date of Patent: Mar. 30, 2021

(54) METAL COATING DEVICE AND METHOD FOR PRODUCTION OF DOUBLE-LAYERED AND COPPER COATED PIPE

(71) Applicant: NET BORU SANAYI VE DIS TICARET KOLLEKTIF SIRKETI BORA SAMAN VE ORTAGI, Istanbul (TR)

(72) Inventor: Bora Saman, Istanbul (TR)

(73) Assignee: NET BORU SANAYI VE DIS TICARET KOLLEKTIF SIRKETI BORA SAMAN VE ORTAGI, Istanbul (TR)

(*) Notice: Subject to any disclaimer, the term of this patent is extended or adjusted under 35 U.S.C. 154(b) by 0 days.

(21) Appl. No.: 16/324,094

(22) PCT Filed: Aug. 8, 2017

(86) PCT No.: PCT/TR2017/050378
§ 371 (c)(1),
(2) Date: Feb. 7, 2019

(87) PCT Pub. No.: WO2018/030972
PCT Pub. Date: Feb. 15, 2018

(65) Prior Publication Data
US 2019/0177870 A1    Jun. 13, 2019

(30) Foreign Application Priority Data
Aug. 8, 2016    (TR) .................................. 2016/11085

(51) Int. Cl.
C25D 21/02    (2006.01)
C25D 7/06    (2006.01)
(Continued)

(52) U.S. Cl.
CPC .............. *C25D 21/02* (2013.01); *C25D 3/38* (2013.01); *C25D 7/0628* (2013.01); *C25D 17/007* (2013.01); *F16L 9/14* (2013.01)

(58) Field of Classification Search
None
See application file for complete search history.

(56) References Cited

U.S. PATENT DOCUMENTS 2,446,548 A * 8/1948 Nachtman ............ C25D 7/0657
                                                              204/206
4,405,420 A      9/1983 Vaughan
2003/0041912 A1  3/2003 Esser

FOREIGN PATENT DOCUMENTS

DE    102005031948 B3    6/2006
FR        2202166 A1     5/1974
(Continued)

OTHER PUBLICATIONS

International search report and written opinion, dated May 28, 2018, of International Application No. PCT/TR2017/050378; 12 pgs.

*Primary Examiner* — Stefanie S Wittenberg
(74) *Attorney, Agent, or Firm* — Kilpatrick Townsend & Stockton LLP

(57) ABSTRACT

The invention is a metal coating device in which the sheet metal fed to a coating container for being copper-coated by electrolysis in the coating container comprising a first roll device having a roll in contact with the sheet metal forwarded in the vertical position and having a rotational axis perpendicular thereto, a carrier body bearing the roll and a current transmitted via a current plate electrically connected to a power source, a coal device which includes an electric current carrying coals from the carrier body to the roll and a cooling chamber provided around the region where the current plate is connected to the carrier body and through which a cooling liquid flows.

12 Claims, 3 Drawing Sheets

(51) Int. Cl.
*C25D 17/00* (2006.01)
*C25D 3/38* (2006.01)
*F16L 9/14* (2006.01)

(56) References Cited

FOREIGN PATENT DOCUMENTS

| | | | | |
|---|---|---|---|---|
| GB | 1390709 A | | 4/1975 | |
| JP | H11229084 A | | 8/1999 | |
| KR | 20070077900 | * | 7/2007 | ............. C25D 17/02 |

* cited by examiner

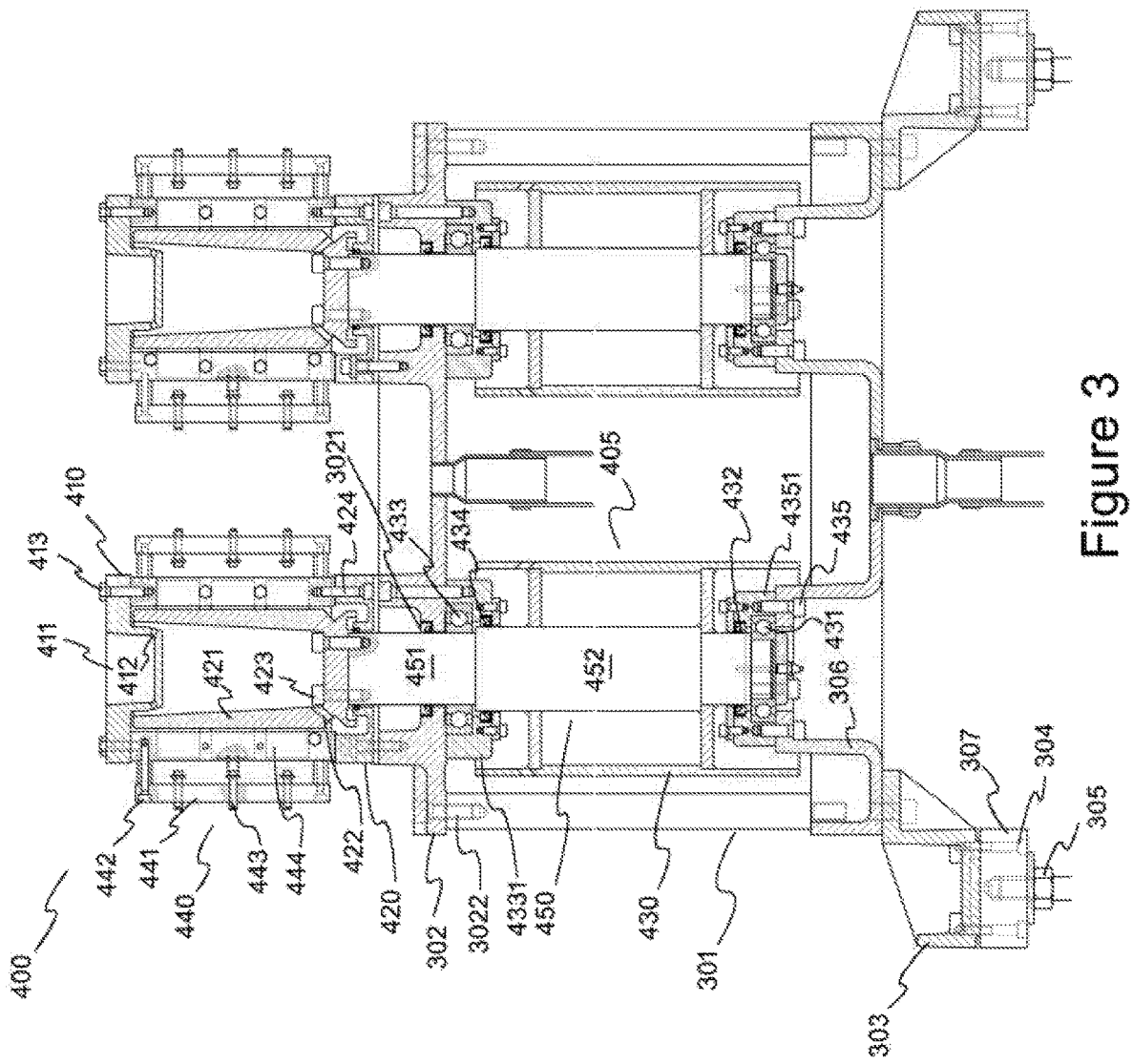

METAL COATING DEVICE AND METHOD FOR PRODUCTION OF DOUBLE-LAYERED AND COPPER COATED PIPE

RELATED APPLICATIONS

This application is a U.S. National Phase of International Application No. PCT/TR2017/050378, filed Aug. 8, 2017, claiming priority to Turkish Patent Application No. 2016/11085, filed Aug. 8, 2016, contents of which are hereby incorporated by reference in their entirety.

TECHNICAL FIELD

The invention relates to a metal coating device and method for a sheet metal which is fed through a coating container by means of a rolls and coated with copper by the electrolysis method inside the coating container. The invention particularly relates to a metal coating device and method used in the production of double-layered and copper coated pipe.

THE PRIOR ART

In the prior art, copper-coated double-layered steel pipes can be used as brake and fuel pipes in the automotive industry.

During its production, steel sheet is horizontally fed through and initially cleaned from oil and then covered with copper in a coating tank by electrolysis method. Subsequently, the copper-coated steel sheet metals are transformed into double-layered pipes by folding and joining methods known in the art. An example of this method is given in patent number U.S. 20030041912 or JP11229084.

However, throughout the process of the sheet metal is moved horizontally which makes placement of the electrodes and the current export operation is extremely difficult. Moreover, it is not possible to apply a homogeneous electric current to the entire sheet metal, so that it is not possible for the copper coating is distributed evenly on both sides.

BRIEF DESCRIPTION OF THE INVENTION

The object of the invention is to enable the electrodes to be used in the electrolytic coating to be easily inserted into the coating device.

Another object of the invention is to ensure uniform coating of entire surface of the sheet metal with copper.

Another object of the invention is to make maintenance of the coating device easier.

Another object of the invention is to make the coating device more compact.

Another object of the invention is to ensure that electrical current can be applied to the sheet metal without causing any damage beyond tolerances.

In order to achieve above objectives, the present invention relates to a metal coating device in which the sheet metal fed through a coating container, wherein the sheet metal is coated with copper by the electrolysis method. The feature of such a coating device is that it comprises a first roll assembly having the following features:
- a first roll in continuous contact with the sheet metal which moves in the vertical position and having a perpendicular axis of rotation,
- a carrier body bearing the roll and electrically connected thereto by a current plate electrically bonded to a power source,
- a coal system comprising coals conveying electric current to the rotating structure roll of the from the carrier body of the fixed structure and
- a cooling chamber which is configured to flow a cooling liquid externally fed through it and provided in the vicinity of the region to which at least the current plate is connected to the carrier body.

A feature of a possible embodiment of the inventive metal coating device comprises the equivalent of a first roll device and according to this a second roll device configured to transfer continuous electrical current to the sheet metal through the roll that is provided in the continuation of the first roll device.

Another possible embodiment of the inventive metal coating device is that it comprises a third roll device provided in the continuation of the second roll device which is identical to the first roll device and is accordingly configured to deliver continuous electrical current to the sheet metal through the roller therein.

Another possible embodiment of the inventive metal coating device is characterized in that the first and third roll device are configured on one side of the sheet metal and the second roll device is configured on the other side of the sheet metal to transmit the electric current.

Thanks to the multiple roll devices, it is possible to guide the sheet metal in a vertical position without bending and falling, and it is also possible to apply an electric current from a large number of points to the sheet metal, which is relatively low and therefore does not harm the structure of the sheet metal.

Another possible embodiment of the inventive metal coating device is that the first, second and third roll devices are positioned relative to each other, so that the sheet metal passes on a straight line.

Another possible embodiment of the inventive metal coating device is that the cooling chamber is fixed to the roll so that it can rotate with the roll in the carrier body. In this way, the electric current is transmitted to the roll via the cooling chamber, and by rotation from the other side, it is possible for the cooling liquid to effectively cool the chamber walls.

Another possible embodiment of the inventive metal coating device is that it contains a discharge channel, which allows the cooling liquid to be bled which poured into the cooling chamber. Thus, the cooling liquid heated after a certain period of time can be bleed from the cooling chamber in a suitable time, and the effective cooling is continued by the cooling liquid in the cold state from the rear.

Another possible embodiment of the inventive metal coating device is characterized in that it comprises a hatch with a feed chamber which is fixed to cover the top of the cooling chamber to the carrier body and is configured to allow the cooling fluid to be poured towards the inner walls of the cooling chamber. At the base of the feed chamber there are feed channels formed to open the outlet towards the inner wall of the cooling chamber. Thus, it is possible to transfer the cooling liquid to the inner wall of the cooling chamber.

Another possible embodiment of the inventive metal coating device is that the coal device is configured in such a way that the electric current is transmitted to the cooling chamber by means of coals. In this way, it is possible to transmit uninterrupted current to the cooling chamber in the rotating structure and thus to the roll.

Another possible embodiment of the inventive metal coating device is that it contains a setting mechanism that allows the coal device to be forwarded towards the cooling chamber as the coal is depleted. Thus, without interrupting production or interrupting the period of minimum, making it possible to constantly interact with the cooling chamber of the coal.

Another possible embodiment of the inventive metal coating device is that coal device comprises a joint sheet connected to the carrier body, a plurality of adjusting bolts extending from said joint sheet toward the carrier body and able to get closer or move away from carrier body by rotating, and the coals provided in such a way that each of which is in contact with a adjusting bolt on the carrier body and in contact with the cooling chamber on the other side.

Another possible embodiment of the inventive metal coating devices is used in a double-layer copper coated pipe production process.

The invention also relates to a metal coating method in which the sheet metal forwarding to a coating tank with rolls is copper coated by means of electrolysis in said coating tank, characterized in that it comprises the following steps:

- forwarding the sheet metal in the vertical position to the coating tank,
- ensuring continuous contact of the sheet metal with the rolls which are beared in a carrier body,
- conveying the electric current to the rolls in the rotating structure and thus to the sheet metal through the rolls by means of a coal device connected to the carrier body in the fixed structure,
- cooling of the zone in order to keep the temperature of the zone where the electric current is transmitted to the rolls of the carrier body under control.

In a possible embodiment of the method of the invention, the sheet metal is guided by a plurality of rolls positioned one after the other and configured to serve as an electrode, each of which conducts a pole of the electric current to the roll.

In another embodiment of the method of the invention, electric current is transferred to one side of the sheet metal with at least one roll and to the other side of the sheet metal with at least one other roll.

In a possible embodiment of the method of the invention, it is provided that the sheet metal can be transmitted without flexion on a straight line by means of rollers.

In a possible embodiment of the method of the invention, the cooling operation is carried out by applying cooling fluid to the portion of the carrier body in contact with the coal.

In another possible embodiment of the method of the invention, the coals are moved so as to ensure that the electrical contact with the roll is not interrupted.

Another possible embodiment of the method of the invention is used in the production of a double-layered copper-coated pipe.

DESCRIPTION OF THE FIGURES

FIG. 3 is a side cross-sectional view of an embodiment of the inventive devices.

DETAILED DESCRIPTION OF THE INVENTION

In this detailed description, the inventive metal coating device and method designed for use in the production of copper-coated double-layered steel pipes are described with examples that will not have any limiting effect for better understanding of the subject matter.

Figure 1:
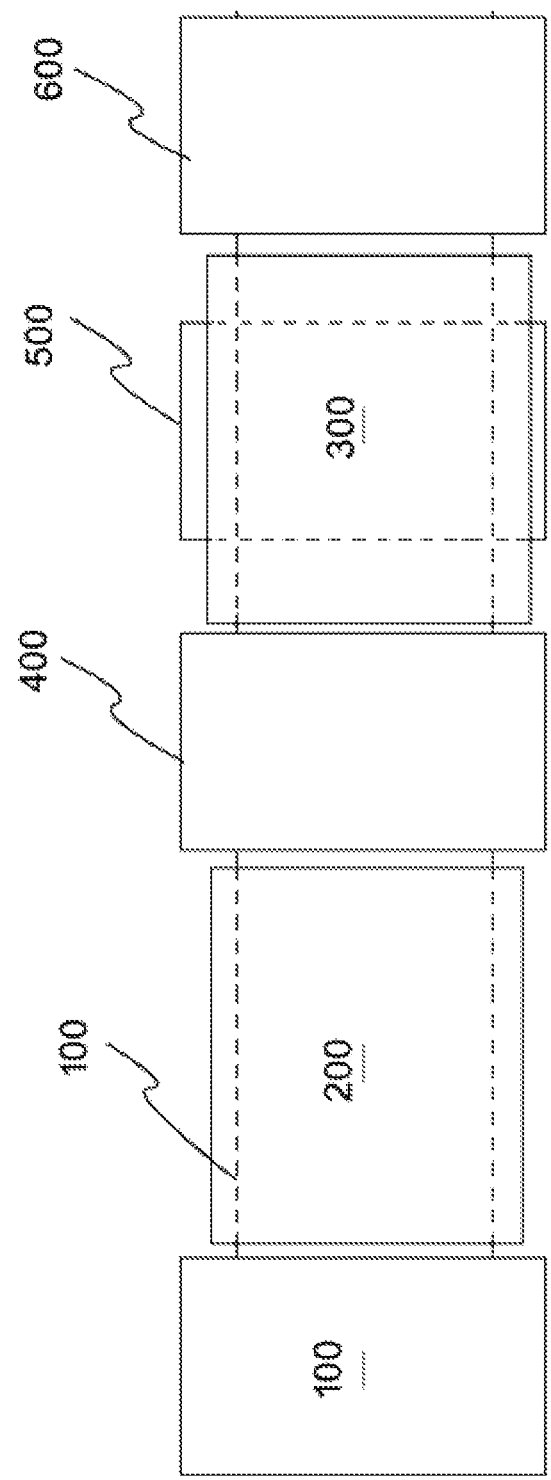
In FIG. 1, a part of the double-layered copper coated pipe production method of the invention is shown as a representative.

Referring to FIG. 1, the sheet metal (100) for the steel sheet rolls standing vertically enters the cleaning container (200) for degreasing primarily by being passed by a pushing or pulling mechanism (not shown). The sheet metal (100), which is free from the protective oil (for example grease) by methods known in the art, enters the coating container (300) at the next stage and is coated with copper in the manner detailed below by means of electrolysis. Accordingly, the sheet metal (100) passing in the vertical position is guided with a first, second and third roll devices (400, 500, 600) at the entrance, inside and at the exit of the coating container (300) and it is also energized through these devices which act as an electrode. In alternative embodiments of the invention, the number of roll devices and the position relative to each other can vary.

Figure 2:
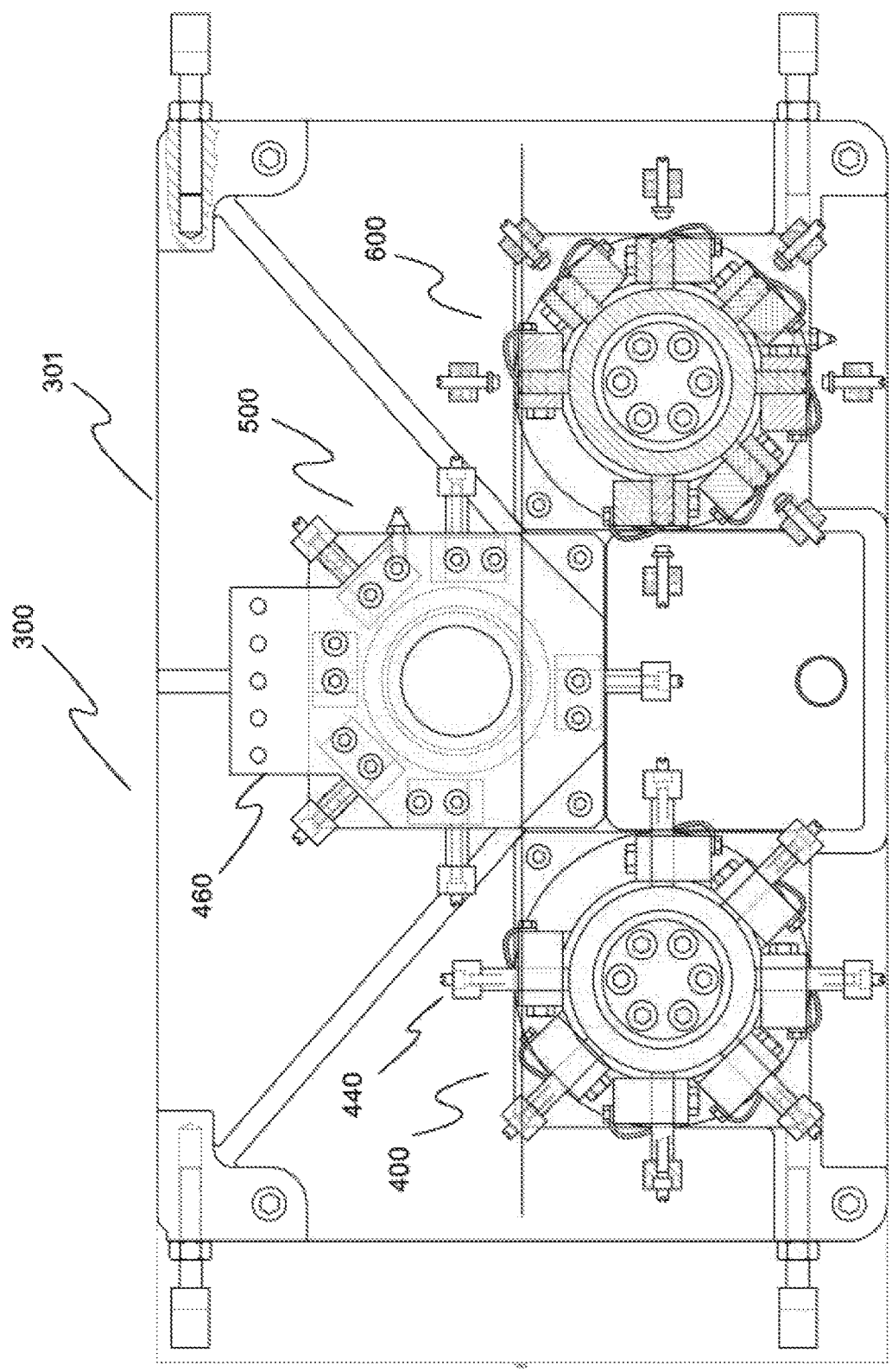
FIG. 2 is a top view of an embodiment of the inventive devices.

FIG. 2 shows a top view of the coating container (300). Accordingly, the first and third roll devices (400, 600) are positioned opposite one another along a long side of the container body (301), each close to a corner. The second roll device (500) is provided at a point near the other long edge and at the middle portion of the other long edge. In other words, the first, second and third roll devices (400, 500, 600) are positioned relative to one another to define the corners of a triangle. The first and third roll devices (400, 600) support the sheet metal (100) from one side and the second roll device (500) supports the sheet metal (100) from the other side. Thus, the sheet passed in the vertical position can be forwarded along a straight line and guided without being tumbled and bent by the first, second and third roll devices (400, 500, 600). As also seen in this figure, each roll device is associated with a current plate (460) that is energized from a power source (not shown).

FIG. 3 shows sectional views of the first and third roll devices (400, 600). Since all of the roll devices are identical, only the first roll device (400) is described in detail. Accordingly, the first roll device (400) has a carrier body (405) in a substantially hollow structure in which a roll (450) is beared. Said carrier body (405) is preferably a multi-piece construction includes a lower part (430) which remains within the container body (301) which is fixed to the bottom of the container body (301) via the lower part joint members (4359 and fixed to the tank hatch (302) from the upper side in which the roll (450) is rotatably beared in the container body (301). The carrier body (405) also includes an upper part (420) that is outside the container body (301) and that is the region where the electric current is applied. The upper part (420) is fixed to the tank hatch (302) from lower part by means of upper part joint member (424). In the upper part (420) there is a cooling chamber (421) which is connected to the roll (450) via chamber joint member (423) and therefore rotates together with the roll (450). Accordingly, the electric current is transferred to the upper part (420), which is in the fixed state, to the cooling chamber (421) rotating through the coal device (440) and to the roll (450) from the cooling chamber (421). The carrier body (405) further comprises a hatch (410) fixed to the upper part (420) by bolted hatch joint member (413).

The roll (450) is beared within the lower part (430) by a lower and upper bearing member (431, 433), which is preferably in the roller structure. In more detail, the lower bearing member (431) is located in a bearing support (306) provided at the bottom of the container body (301) and is confined by a lower bearing hatch (4351). A first sealing member (432) within the trapped area is provided to provide fluid sealing. The upper bearing member (433) on the upper side is trapped in an upper bearing hatch (4331) fixed below the tank hatch (302) and there is a second sealing member (434) to provide fluid sealing to the trapped area.

The rotatable roll (450) in the carrier body (405) consists of a lower roll part (452) and a upper roll part (451) having a diameter narrower than the lower roll part mentioned that there will be an occasional gap. Accordingly, preferably, the upper bearing member (433) is beared on the roll (450) to be seated. The upper roll part (451) exits from the roll gap (3021) of the tank hatch (302) and is connected to the cooling chamber (421) via said chamber joint member (423).

As generally mentioned above, there is a plurality of coal devices (440) positioned so as to extend perpendicularly at certain intervals along the circumference of the lateral surface of the upper part (420). Each coal device (440) includes a joint sheet (441) that is spaced apart from the upper part (420) and that extends parallel to the upper part (420) in a vertical direction. To this end, the joint sheet (441) is connected to the upper part (420) of the bolt-shaped joint members (442) from both ends thereof, preferably from an upper side and a lower side. A plurality of adjusting bolts (443), each extending substantially parallel to the lateral surface of the upper part (420) from the joint sheet (441), are provided on the joint sheet (441) at regular intervals. On the other hand, there are coals (444) which are in contact with the cooling chamber (421) in the multitude and rotary structures extending vertically on the lateral surface of the upper part (420) as a space therebetween. Accordingly, each adjusting bolt (443) is mated with its corresponding coal (444).

Accordingly, as the coals (444) melt over time, by the rotating the adjusting bolts (443), the coals (444) is forwarded towards the rotating cooling chamber (421) so that electrical contact is not interrupted. When the coals (444) are completely exhausted, the joint sheet (441) is removed from its position and the coals (444) on the lateral surface of the upper part can be easily replaced.

While the roll (450) is rotating, which serves as an electrode that receives electric current through the cooling chamber (421) and transmits a polarity of the electric current in this way, is in contact with the sheet metal (100) forwarded by a drive source (not shown) at the same time. Thus, the sheet metal (100) reaches a pole of the electric current through the roll (450). It is also possible for the surface of the sheet metal (100) to be coated with copper by electrolysis, as is known in the art, since the coating container (300) is also immersed in an electrode (not shown) that conducts the other polarity of the electric current.

As can be understood from the above structural details, it is possible to transmit the current to the three different regions of the sheet metal with the first, second and third roll devices (400, 500, 600) used. Thus, the current strength to be given to each zone can be reduced in a way that does not damage the sheet metal. For example, applying a current of 6000 Amperes to a sheet metal can damage the structure of the sheet metal if current is supplied from a single area. At the same time, a coating with the desired homogeneity may not be possible. However, when a current of 2000 amperes is applied from 3 different regions, both sheet metal is not damaged and it is possible to coat copper with electrolysis method more homogeneously. Reduction of the current to a very high point also avoids high temperatures on the side of the carrier body (405). This provides a significant advantage in terms of easier cooling and no damage to the carrier body (405) material.

Referring to FIG. 3, at the bottom of the cooling chamber (421) there is a discharge channel (422) and the cooling chamber (421) is closed by the hatch (410) fixed to the upper part (420) by the hatch joint member (413). Similarly, the hatch (410) has a feed chamber (411) with feed channels (412) at its base. Accordingly, a cooling fluid, for example, such as water poured into the feed chamber (411) as it is being channeled by a coolant source (not shown), is poured into the cooling chamber (421) via the feed channels (412) in a controlled and regulated manner. The outlet of the feed channel (412) opens towards the inner wall of the cooling chamber (421). Thus, the cooling liquid poured from the feed chamber (411) reaches the inner walls of the cooling chamber (421), and efficient cooling of the wall is thus possible. Since the cooling chamber 421 is in a rotating configuration, it is possible to spread the cooling liquid to all the walls by the centrifugal force of the cooling liquid, which further enhances the cooling efficiency. On the other hand, the cooling liquid poured into the cooling chamber (421) is likewise discharged through the discharge channel (422) from the roll device (400).

As can also be seen from FIG. 3, the coating container body (301) rests on the fixing stands (303). The fixing stands (303) are connected to the ground joint part (307) by the stand joint member (304). The ground joint part (307) is fixed to the floor with an anchor (305).

REFERENCE NUMBERS

100 Sheet metal
200 Cleaning container
300 Coating container
301 Container body
302 Tank hatch
3021 Roll gap
303 Fixing stand
304 Stand joint member
305 Anchor
306 Bearing support
307 Ground joint part
400 First roll device
405 Carrier body
410 Hatch
411 Feed chamber
412 Feed channel
413 Hatch joint member
420 Upper part
421 Cooling chamber
422 Discharge channel
423 Chamber joint member
424 Upper part joint member
430 Lower part
431 Lower bearing member
432 First sealing member
433 Upper bearing member
4331 Upper bearing hatch
434 Second sealing member
435 Lower part joint member
4351 Lower bearing hatch
440 Coal device
441 Joint sheet
442 Joint member
443 Adjusting bolt
444 Coal
450 Roll
451 Upper roll part
452 Lower roll part 460 Current plate
500 Second roll device
600 Third roll device

The invention claimed is:

1. A metal coating device comprising:
a coating container for feeding through a sheet metal for coating the sheet metal with copper by an electrolysis method; and
a first roll device comprising:
a roll in continuous contact with the sheet metal that moves in a vertical position, wherein the roll rotates around an axis of rotation perpendicular to the ground,
a carrier body bearing the roll and electrically connected thereto by a current plate electrically bonded to a power source supplying electric current,
a coal system comprising coals conveying the electric current to the roll from the carrier body, and
a cooling chamber which is configured to flow a cooling liquid and provided at a region to which at least the current plate is connected to the carrier body, wherein the cooling chamber is fixed to the roll so that the cooling chamber rotates with the roll in the carrier body.

2. The metal coating device according to claim 1, further comprising a second roll device configured to receive the sheet metal from the first roll device, and to transfer continuous electrical current to the sheet metal.

3. The metal coating device according to claim 2, further comprising a third roll device configured to receive the sheet metal from the second roll device, and to deliver continuous electrical current to the sheet metal.

4. The metal coating device according to claim 3, wherein the first and third roll device are configured on one side of the sheet metal and the second roll device is configured on the other side of the sheet metal to transmit the electric current.

5. The metal coating device according to claim 3, wherein the first, second and third roll devices are positioned relative to each other, so that the sheet metal passes on a straight line.

6. The metal coating device according to claim 1, further comprising a discharge channel configured to discharge the cooling liquid from the cooling chamber.

7. The metal coating device according to claim 6, further comprising a hatch with a feed chamber which is fixed to cover a top of the cooling chamber to the carrier body and is configured to allow the cooling liquid to be poured towards inner walls of the cooling chamber.

8. The metal coating device according to claim 7, further comprising feed channels formed at a base of the feed chamber, wherein the feed channels form an outlet towards an inner wall of the cooling chamber.

9. The metal coating device according to claim 1, wherein the coal system is configured in such a way that the electric current is transmitted to the cooling chamber by means of coal.

10. The metal coating device according to claim 9, further comprising a setting mechanism configured to move the coal system towards the cooling chamber as the coal is depleted.

11. The metal coating device according to claim 1, wherein the coal system comprises a joint sheet connected to the carrier body, a plurality of adjusting bolts extending from said joint sheet toward the carrier body and configured to move toward or away from the carrier body by rotating, wherein each coal is in contact with one adjusting bolt of the carrier body on one side and on the other side in contact with the cooling chamber.

12. A metal coating device comprising:
a coating container for feeding through a sheet metal for coating the sheet metal with copper by an electrolysis method; and
a first roll device comprising:
a roll in continuous contact with the sheet metal that moves in a vertical position, wherein the roll rotates around an axis of rotation perpendicular to the ground,
a carrier body bearing the roll and electrically connected thereto by a current plate electrically bonded to a power source supplying electric current,
a coal system comprising coals conveying the electric current to the roll from the carrier body, and
a cooling chamber which is configured to flow a cooling liquid and provided at a region to which at least the current plate is connected to the carrier body,
wherein the coal system comprises a joint sheet connected to the carrier body, a plurality of adjusting bolts extending from said joint sheet toward the carrier body and configured to move toward or away from the carrier body by rotating, wherein each coal is in contact with one adjusting bolt of the carrier body on one side and on the other side in contact with the cooling chamber.

* * * * *